(12) United States Patent
Nakatsuhama et al.

(10) Patent No.: US 7,010,709 B2
(45) Date of Patent: Mar. 7, 2006

(54) INFORMATION PROCESSING DEVICE

(75) Inventors: Norihiro Nakatsuhama, Kawasaki (JP); Yoshiaki Nagatomi, Kawasaki (JP); Yoshiyuki Kubo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 471 days.

(21) Appl. No.: 10/354,098

(22) Filed: Jan. 30, 2003

(65) Prior Publication Data

US 2003/0167416 A1 Sep. 4, 2003

(30) Foreign Application Priority Data

Mar. 1, 2002 (JP) ............................. 2002-055481

(51) Int. Cl.
*G06F 1/32* (2006.01)
(52) U.S. Cl. ........................................ 713/322; 710/61
(58) Field of Classification Search ................ 713/322
See application file for complete search history.

(56) References Cited

U.S. PATENT DOCUMENTS 5,878,234 A * 3/1999 Dutkiewicz et al. ........ 710/110
5,925,135 A * 7/1999 Trieu et al. ................. 713/400
6,546,496 B1 * 4/2003 Wang et al. ................ 713/322
6,760,578 B1 * 7/2004 Rotzoll ..................... 455/343.2

OTHER PUBLICATIONS

Japanese Patent Abstract No.: 09-116590 dated May 2, 1997.

* cited by examiner

*Primary Examiner*—Thomas Lee
*Assistant Examiner*—Albert Wang
(74) *Attorney, Agent, or Firm*—Staas & Halsey LLP

(57) ABSTRACT

An information processing device capable of accepting a communication request from another information processing device without fail, regardless of whether the device is in a standby state or not. A first condition detection circuit detects, synchronously with a clock signal, a communication start condition for starting communication with the other information processing device, and a second condition detection circuit detects, asynchronously with the clock signal, the communication start condition for starting communication with the other information processing device. A selector circuit selects a suitable one of the first and second condition detection circuits.

11 Claims, 21 Drawing Sheets

INFORMATION PROCESSING DEVICE

CROSS-REFERENCE TO RELATED APPLICATIONS

This application is based upon and claims the benefits of priority from the prior Japanese Patent Application No. 2002-055481, filed on Mar. 1, 2002, the entire contents of which are incorporated herein by reference.

BACKGROUND OF THE INVENTION

1. Field of the Invention

The present invention relates to an information processing device, and more particularly, to an information processing device connected to another information processing device for communicating information therewith.

2. Description of the Related Art

In many portable information processing devices, battery is used as their power supply. To prolong the life of the battery, therefore, a method of preventing waste of electric power is generally known wherein the system is set in a standby state when it is not required to process information.

To set the system in the standby state, a method of stopping the supply of a clock signal, for example, is well known.

FIG. 20 shows an example of such a conventional information processing device. In the example shown in the figure, information processing devices 10 and 30 are interconnected by a bus 20 to constitute a system.

The information processing device 10 comprises a CPU (Central Processing Unit) 11, a clock control circuit 12, a main circuit 13, a communication circuit 14, and a memory 15. The device 10 processes information exchanged with the information processing device 30 through the bus 20, and when there is no information to be processed, the CPU 11 causes the clock control circuit 12 to stop the generation of a clock signal, to thereby reduce the consumption of power.

The CPU 11 controls the individual parts of the device in accordance with programs and data stored in the memory 15, and also performs a variety of information processing.

The clock control circuit 12 starts or stops the generation of the clock signal under the control of the CPU 11.

The main circuit 13 comprises, for example, an interface circuit etc.

The communication circuit 14 carries out data conversion and protocol conversion when exchanging information with the information processing device 30 through the bus 20.

The memory 15 comprises a semiconductor memory such as a RAM (Random Access Memory), for example, and temporarily stores programs executed by the CPU 11 as well as data.

On the other hand, the information processing device 30 comprises a CPU 31, a clock control circuit 32, a main circuit 33, a communication circuit 34, and a memory 35.

The CPU 31 controls the individual parts of the device in accordance with programs and data stored in the memory 35, and also performs a variety of information processing.

The clock control circuit 32 starts or stops the generation of a clock signal under the control of the CPU 31.

The main circuit 33 comprises, for example, an interface circuit etc.

The communication circuit 34 carries out data conversion and protocol conversion when exchanging information with the information processing device 10 through the bus 20.

The memory 35 comprises a semiconductor memory such as a RAM, for example, and temporarily stores programs executed by the CPU 31 as well as data.

Operation of the conventional device configured as above will be now described.

While the device is operating normally, the CPU 11 instructs the clock control circuit 12 to supply a clock signal, and therefore, the clock control circuit 12 generates and supplies a clock signal to the individual parts of the device.

On the other hand, when the device is switched to the standby state, the CPU 11 requests the clock control circuit 12 to stop the generation of the clock signal. As a result, the clock control circuit 12 stops generating the clock signal, so that the main circuit 13, the communication circuit 14 and the memory 15 are brought to a stopped state, whereby the consumption of electric power can be restrained.

FIG. 21 shows an example of another conventional device. In the example shown in the figure, the information processing device 10 is additionally provided with an external interrupt circuit 16. In other respects, the device is configured in the same manner as the counterpart shown in FIG. 20.

The external interrupt circuit 16 is always supplied with power and thus is capable of operation. When input with an interrupt signal from the information processing device 30 while the information processing device 10 is in the standby state, the external interrupt circuit accepts the interrupt request and wakes the CPU 11 up to resume normal operation.

Specifically, if, while the information processing device 10 is in the standby state, a request occurs in the information processing device 30 for a certain process to be executed by the information processing device 10, the information processing device 30 generates an interrupt signal with respect to the information processing device 10.

Consequently, the external interrupt circuit 16 of the information processing device 10 supplies a wakeup signal to the CPU 11. On receiving the wakeup signal, the CPU 11 requests the clock control circuit 12 to restart the generation of the clock signal. As a result of the request, the clock control circuit 12 restarts to generate the clock signal, whereupon the information processing device 10 switches from the standby state to the normal state.

In the conventional device shown in FIG. 20, when the information processing device 10 is in the standby state, the communication circuit 14 also is in the stopped state. A problem therefore arises in that a request for a process, if occurred in the information processing device 30, cannot be accepted.

In the example shown in FIG. 21, when the device 10 is in the standby state, the generation of the clock signal is stopped by the clock control circuit 12, and accordingly, the external interrupt circuit 16 operates asynchronously with the clock signal when looking up the state of the signal supplied from the communication circuit 34 to recognize the generation of an interrupt and supplying the wakeup signal to the CPU 11. Because of the operation asynchronous with the clock signal, therefore, malfunction can be caused by noise superposed on the bus 20.

Also, since there is a time lag from the acceptance of the interrupt signal until the clock control circuit 12 actually starts to supply the clock signal, a problem arises in that the first data transmitted from the information processing device 30 may fail to be received.

SUMMARY OF THE INVENTION

The present invention was created in view of the above circumstances, and an object thereof is to provide an information processing device which can recover from a standby state without fail when a request is received from another information processing device and which also is free from the failure to receive data.

To achieve the object, there is provided an information processing device connected to a second information processing device for communicating information therewith through a bus. The information processing device comprises a first condition detection circuit for detecting, synchronously with a clock signal, a communication start condition for starting communication with the second information processing device, a second condition detection circuit for detecting, asynchronously with the clock signal, the communication start condition for starting communication with the second information processing device, and a selector circuit for selecting a suitable one of the first and second condition detection circuits.

Also, to achieve the above object, there is provided an information processing device connected to a second information processing device for communicating information therewith through a bus. The information processing device comprises a first condition detection circuit for detecting, synchronously with a clock signal, a communication start condition for starting communication with the second information processing device, a CR oscillator circuit for oscillating at a predetermined frequency, a second condition detection circuit for detecting, synchronously with a signal output from the CR oscillator circuit, the communication start condition for starting communication with the second information processing device, and a selector circuit for selecting a suitable one of the first and second condition detection circuits.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Embodiments of the present invention will be hereinafter described with reference to the drawings.

Figure 1:
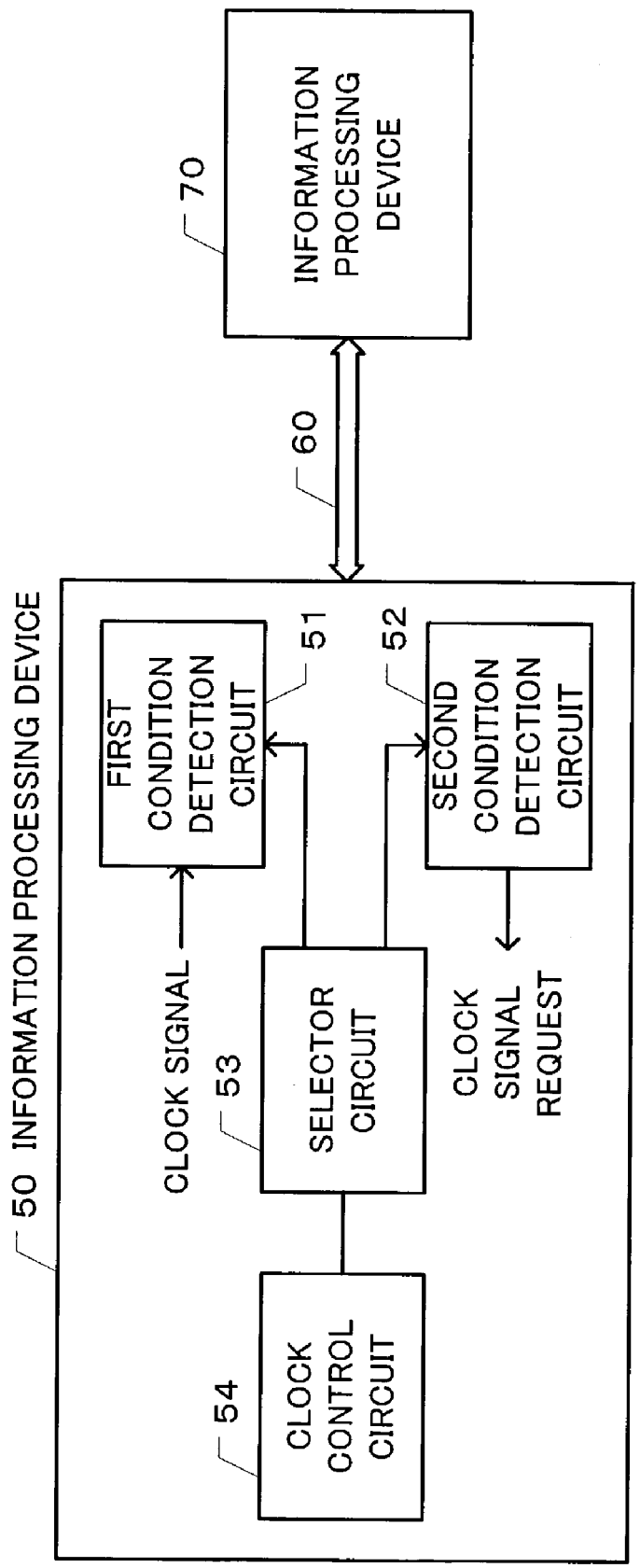
FIG. 1 is a diagram illustrating the principle of operation according to the present invention.

FIG. 1 illustrates the principle of operation according to the present invention. As shown in the figure, an information processing device 50 of the present invention comprises a first condition detection circuit 51, a second condition detection circuit 52, a selector circuit 53, and a clock control circuit 54.

The first condition detection circuit 51 detects, in synchronism with a clock signal, a communication start condition for starting communication with another information processing device 70.

The second condition detection circuit 52 also detects the communication start condition for starting communication with the other information processing device 70 but asynchronously with the clock signal.

The selector circuit 53 selects a suitable one of the first and second condition detection circuits 51 and 52.

The clock control circuit 54 controls the start and stop of the supply of the clock signal to the individual parts of the information processing device 50.

Operation in accordance with the aforementioned principle will be now described.

While the device is operating normally, the selector circuit 53 selects the first condition detection circuit 51. The first condition detection circuit 51 reads, in synchronism with the clock signal, a signal supplied thereto from the information processing device 70 through a bus 60. If start of communication is requested, the request is detected by the circuit 51. As a result, communication is started between the information processing devices 50 and 70 through the bus 60.

On the other hand, when the information processing device 50 switches to standby mode, the selector circuit 53 selects the second condition detection circuit 52. On completion of the selection, the clock control circuit 54 stops the supply of the clock signal to the individual parts of the device, whereby the consumption of electric power by the information processing device 50 can be reduced.

While in this state, if communication is requested from the information processing device 70, the second condition detection circuit 52 detects the request and generates and outputs a signal "CLOCK SIGNAL REQUEST" requesting the restart of generation of the clock signal.

As a result, the clock control circuit 54 starts to generate the clock signal, thereby restarting the supply of the clock signal to the individual parts of the device.

Subsequently, the second condition detection circuit 52 requests the selector circuit 53 to select the first condition detection circuit 51. As a result, the selector circuit 53 selects the first condition detection circuit 51. Accordingly, when communication is requested thereafter from the information processing device 70, the first condition detection circuit 51 detects the request in synchronism with the clock signal. Thus, even if noise is superposed on the bus 60, for example, the request can be detected with accuracy.

As described above, the information processing device 50 of the present invention is provided with the first and second condition detection circuits 51 and 52, and during normal operation the first condition detection circuit 51 is selected by the selector circuit 53, while in the standby state the second condition detection circuit 52 is selected by the selector circuit 53, whereby communication request from the information processing device 70 can be detected by an optimum detection method in the individual states of the device.

If, in the standby state, a communication request is detected, the second condition detection circuit 52 requests the generation of the clock signal and also requests the selector circuit 53 to select the first condition detection circuit 51. Consequently, also after the communication request is detected in the standby state, the operation can be continued normally.

Embodiments of the present invention will be now described.

Figure 2:
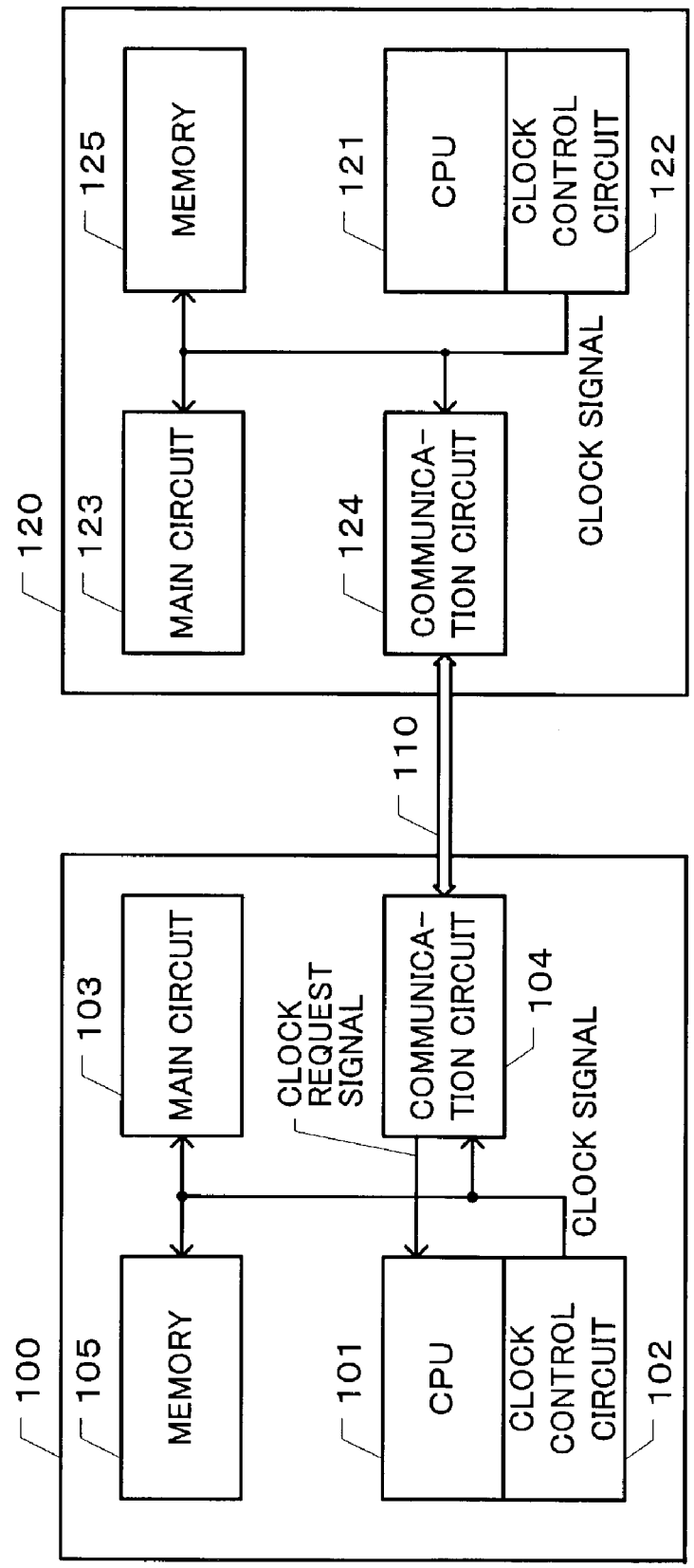
FIG. 2 is a diagram illustrating an exemplary configuration according to a first embodiment of the present invention.

FIG. 2 illustrates an exemplary configuration according to a first embodiment of the present invention. As shown in the figure, in the first embodiment of the invention, information processing devices 100 and 120 are connected to each other by a bus 110.

The information processing device 100 comprises a CPU 101, a clock control circuit 102, a main circuit 103, a communication circuit 104, and a memory 105. The device 100 processes information exchanged with the information processing device 120 through the bus 110, and when there is no information to be processed, the CPU 101 causes the clock control circuit 102 to stop the generation of a clock signal, to thereby reduce the consumption of power.

The CPU 101 controls the individual parts of the device in accordance with programs and data stored in the memory 105, and also carries out a variety of information processing.

The clock control circuit 102 starts or stops the generation of the clock signal under the control of the CPU 101.

The main circuit 103 comprises, for example, an interface circuit etc.

The communication circuit 104 carries out data conversion and protocol conversion when exchanging information with the information processing device 120 through the bus 110.

Figure 3:
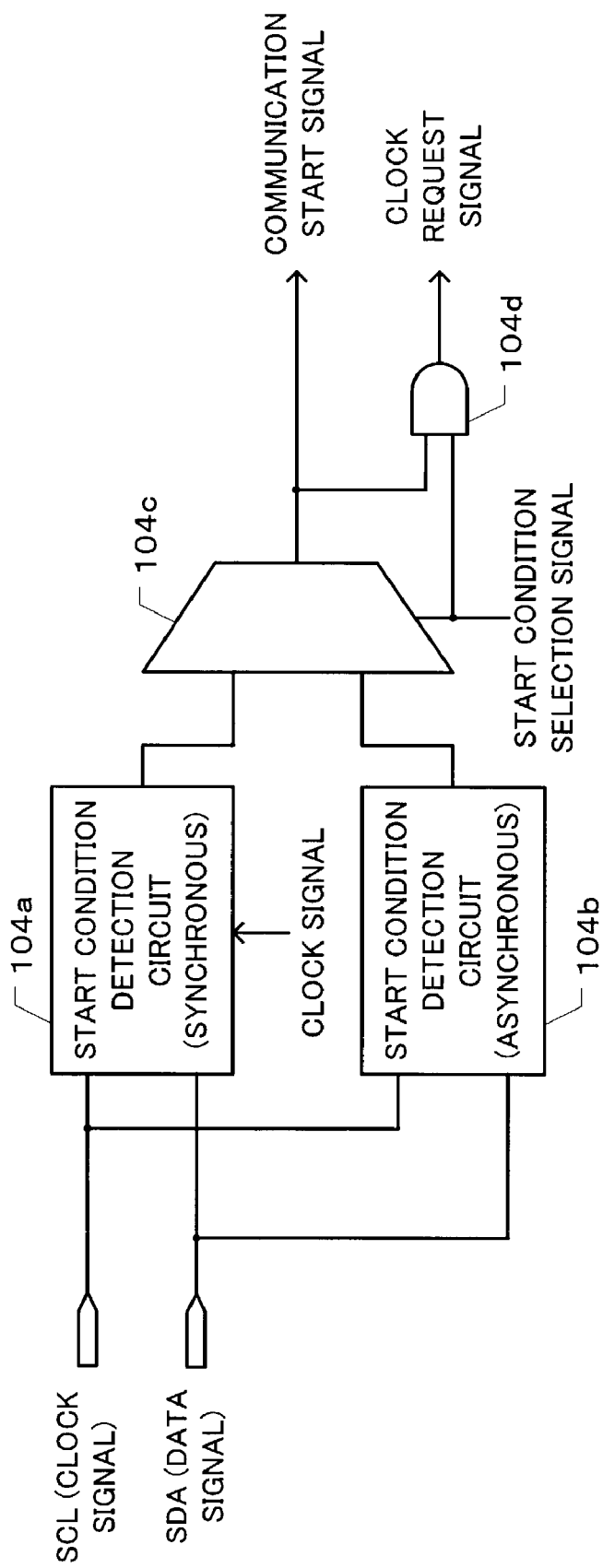
FIG. 3 is a diagram illustrating in detail an exemplary configuration of a communication circuit appearing in FIG. 2.

FIG. 3 shows in detail an exemplary configuration of the communication circuit 104. As illustrated in the figure, the communication circuit 104 comprises a start condition detection circuit (synchronous) 104a, a start condition detection circuit (asynchronous) 104b, a selector 104c, and an AND gate 104d.

The start condition detection circuit 104a latches a signal transmitted from the information processing device 120 and detects a communication request (start condition), in synchronism with the clock signal supplied from the clock control circuit 102.

The other start condition detection circuit 104b latches a signal transmitted from the information processing device 120 and detects a communication request, without synchronizing with the clock signal.

The selector 104c selects one of the start condition detection circuits 104a and 104b in accordance with a start condition selection signal supplied from the CPU 101, and outputs the signal from the selected circuit as a communication start signal.

The AND gate 104d obtains a logical product of the start condition selection signal and the communication start signal output from the selector 104c, and outputs the obtained result as a clock request signal.

The memory 105 comprises a semiconductor memory such as a RAM, for example, and temporarily stores programs executed by the CPU 101 as well as data.

On the other hand, the information processing device 120 comprises a CPU 121, a clock control circuit 122, a main circuit 123, a communication circuit 124, and a memory 125.

The CPU 121 controls the individual parts of the device in accordance with programs and data stored in the memory 125, and also performs a variety of information processing.

The clock control circuit 122 starts or stops the generation of a clock signal under the control of the CPU 121.

The main circuit 123 comprises, for example, an interface circuit etc.

The communication circuit 124 carries out data conversion and protocol conversion when exchanging information with the information processing device 100 through the bus 110.

The memory 125 comprises a semiconductor memory such as a RAM, for example, and temporarily stores programs executed by the CPU 121 as well as data.

Operation of the embodiment configured as above will be now described.

First, operation in a normal state will be explained. During normal operation, the CPU 101 sets the start condition selection signal to "L", so that the selector 104c selects and outputs the output from the start condition detection circuit 104a.

Figure 4:
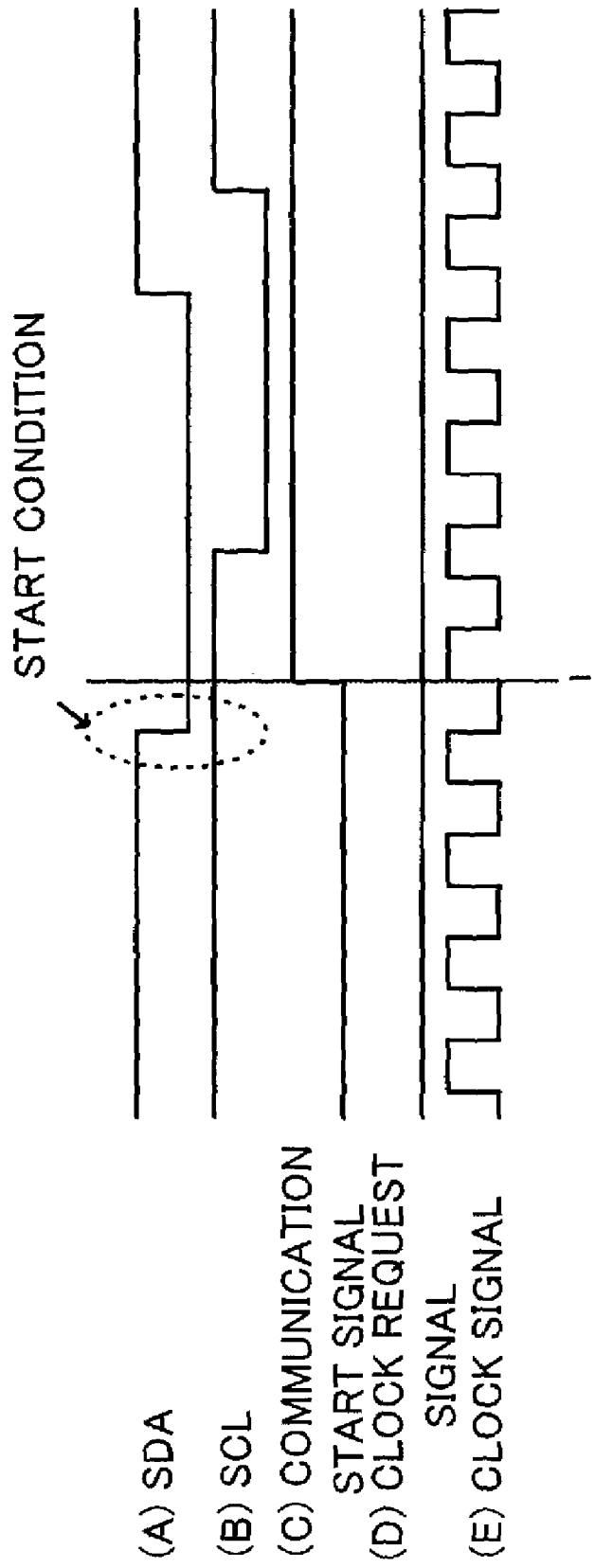
FIG. 4 is a timing chart illustrating operation of the embodiment shown in FIG. 2.

FIG. 4 is a timing chart illustrating an operation in the case where, during normal operation, a communication request is made from the information processing device 120.

It is assumed herein that the start condition as the communication request represents a state in which a trailing edge of an SDA signal (data signal; cf. (A) in FIG. 4) is detected while an SCL signal (clock signal; cf. (B) in FIG. 4) is at "H". If the SDA and SCL signals, which are output signals from the communication circuit 124, show the start condition as indicated by the dotted ellipse in FIG. 4, the start condition detection circuit 104a detects the start condition and sets the signal output to the selector 104c to "H", in synchronism with the succeeding leading edge (at the timing indicated by the vertical solid line in FIG. 4) of the clock signal (cf. (D) in the same figure).

Since the selector 104c is then selecting the start condition detection circuit 104a, the signal is supplied to the CPU 101 as the communication start signal (cf. (C) in FIG. 4). As a consequence, the CPU 101 starts to exchange information with the information processing device 120.

In this case, the start condition selection signal remains at "L", and accordingly, the clock request signal (cf. (D) in FIG. 4), which is the output of the AND gate 104d, also remains at "L", that is, in an inactive state.

Figure 5:
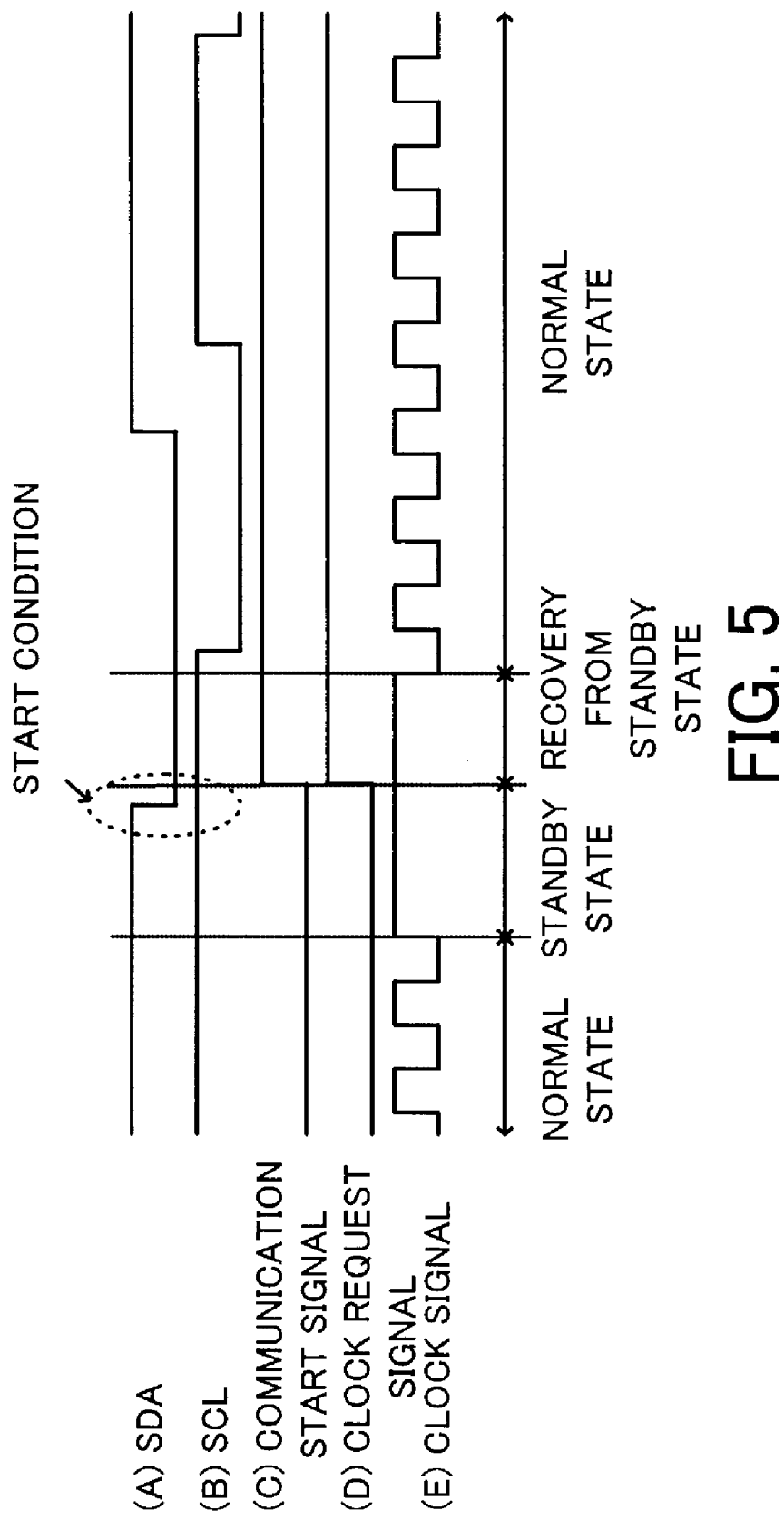
FIG. 5 is a timing chart also illustrating operation of the embodiment shown in FIG. 2.

Referring now to FIG. 5, an operation performed in the case where a communication request is received in the standby state will be described.

First, when switching the device to the standby state, the CPU 101 sets the start condition selection signal to "H", and as a result, the selector 104c selects the output of the start condition detection circuit 104b.

Figure 6:
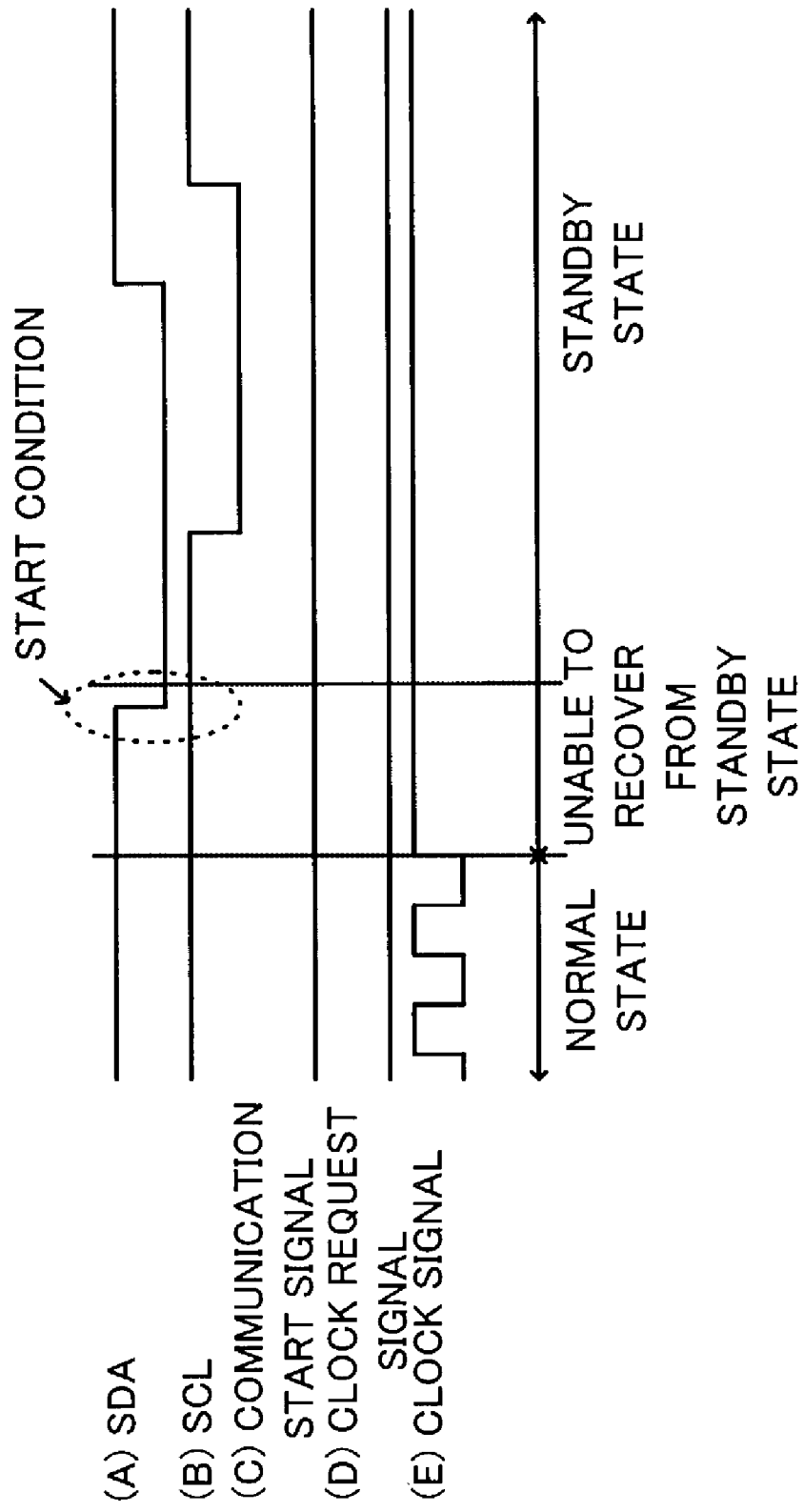
FIG. 6 is a timing chart illustrating operation of the embodiment shown in FIG. 2.

As shown in FIG. 5, after the device is switched to the standby state from the normal state, the clock signal halts. Accordingly, if the start condition detection circuit 104a which detects the start condition in synchronism with the clock signal is used, the start condition fails to be detected, as shown in FIG. 6, making it impossible for the device to recover from the standby state.

According to this embodiment, if, in the standby state, the SDA signal (cf. (B) in FIG. 5) falls while the SCL signal (cf. (A) in FIG. 5) is at "H", the start condition detection circuit 104b detects the fall of the signal, irrespective of the clock signal, whereby the communication request can be detected without fail and the communication start signal (cf. (C) in FIG. 5) can be set to "H".

Also, since the start condition selection signal is then in the "H" state as mentioned above, the clock request signal (cf. (D) in FIG. 5), which is the output of the AND gate 104d, turns to "H" as soon as the communication start signal is set to "H". The clock request signal is supplied to the clock control circuit 102 via the CPU 101, so that the supply of the clock signal is started, making it possible to restore the device to the normal state from the standby state (cf. FIG. 5).

As described above, the first embodiment of the present invention is provided with the start condition detection circuit 104a for detecting a communication request synchronously with the clock signal, and the start condition detection circuit 104b for detecting a communication request asynchronously with the clock signal. In the normal state, the start condition detection circuit 104a is used to detect a communication request, while in the standby state, the start condition detection circuit 104b is used to detect a communication request, whereby the communication request can be detected by an optimum method in the individual operating states.

As a consequence, it is possible to prevent the device from malfunctioning due to noise etc. superposed on the bus 110.

A second embodiment of the present invention will be now described.

Figure 7:
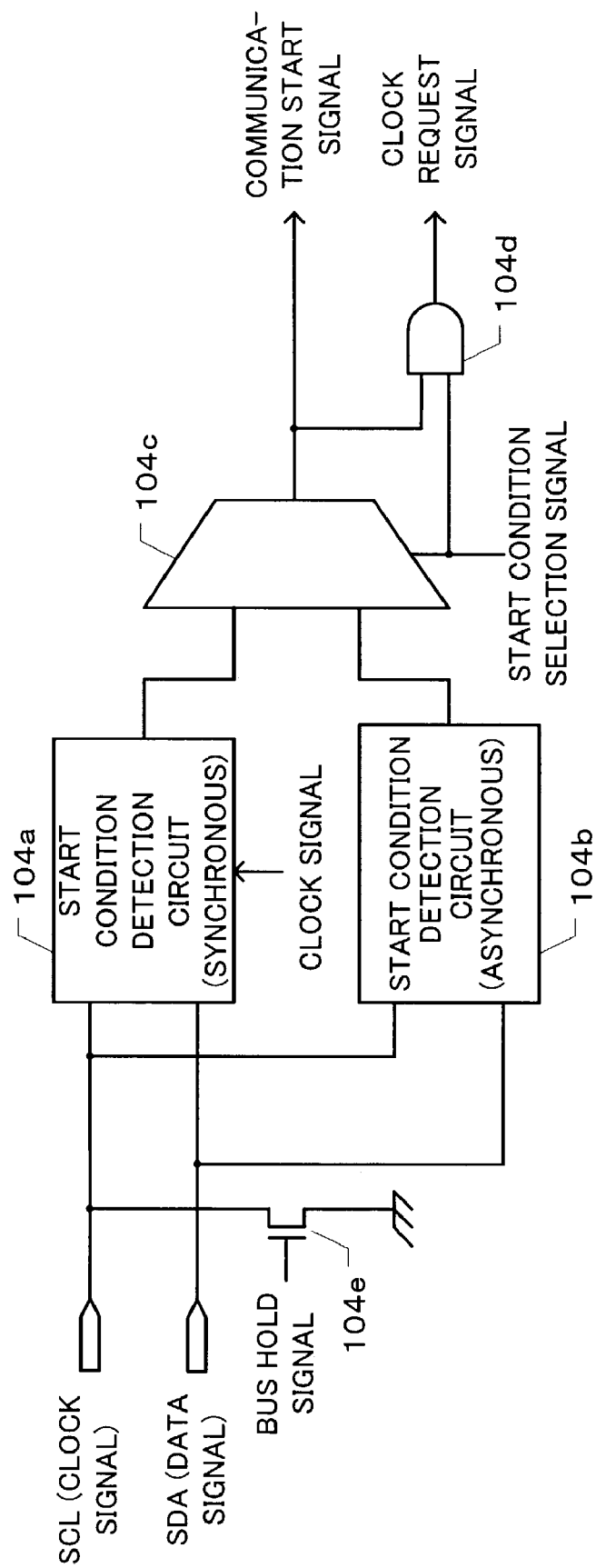
FIG. 7 is a diagram illustrating an exemplary configuration according to a second embodiment of the present invention.

FIG. 7 illustrates an exemplary configuration according to the second embodiment of the present invention. In the figure is illustrated an example of detailed configuration of the communication circuit 104 appearing in FIG. 2. Since the other parts of the information processing device are identical with those shown in FIG. 2, description thereof is omitted.

The communication circuit 104 according to the second embodiment of the present invention comprises, as shown in the figure, a start condition detection circuit (synchronous) 104a, a start condition detection circuit (asynchronous) 104b, a selector 104c, an AND gate 104d, and a semiconductor switch 104e.

The start condition detection circuit 104a latches a signal transmitted from the communication circuit 104 and detects a communication request in synchronism with the clock signal supplied from the clock control circuit 102.

The start condition detection circuit 104b also latches a signal transmitted from the communication circuit 104 and detects a communication request but asynchronously with the clock signal.

The selector 104c selects one of the start condition detection circuits 104a and 104b in accordance with the start condition selection signal supplied from the CPU 101, and outputs the signal from the selected circuit as the communication start signal.

The AND gate 104d obtains a logical product of the start condition selection signal and the communication start signal output from the selector 104c, and outputs the obtained result as the clock request signal.

The semiconductor switch 104e turns ON when a bus hold signal supplied thereto from the CPU 101 is at "H", to ground the clock signal line and thereby establish a bus hold state.

Operation according to the second embodiment of the present invention will be now described.

Figure 8:
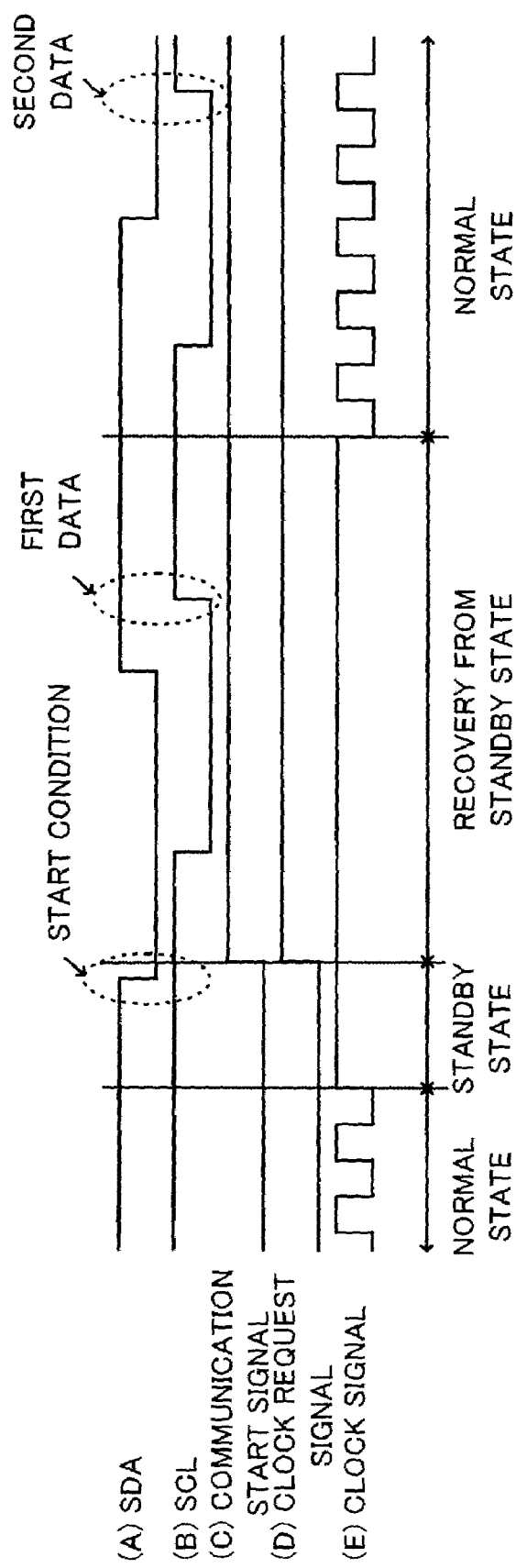
FIG. 8 is a timing chart illustrating operation of the embodiment shown in FIG. 7.

FIG. 8 illustrates operation of a conventional device. In the case of the conventional device, when the start condition (a state in which the SDA (cf. (A) in FIG. 8) falls while the SCL (cf. (B) in FIG. 8) is at "H"), indicated by a dotted ellipse in the figure, is detected, the device switches to the normal state. Transition to the normal state, however, requires a certain period of time. Thus, if first data is input during the "RECOVERY FROM STANDBY STATE", the data fails to be received.

Figure 9:
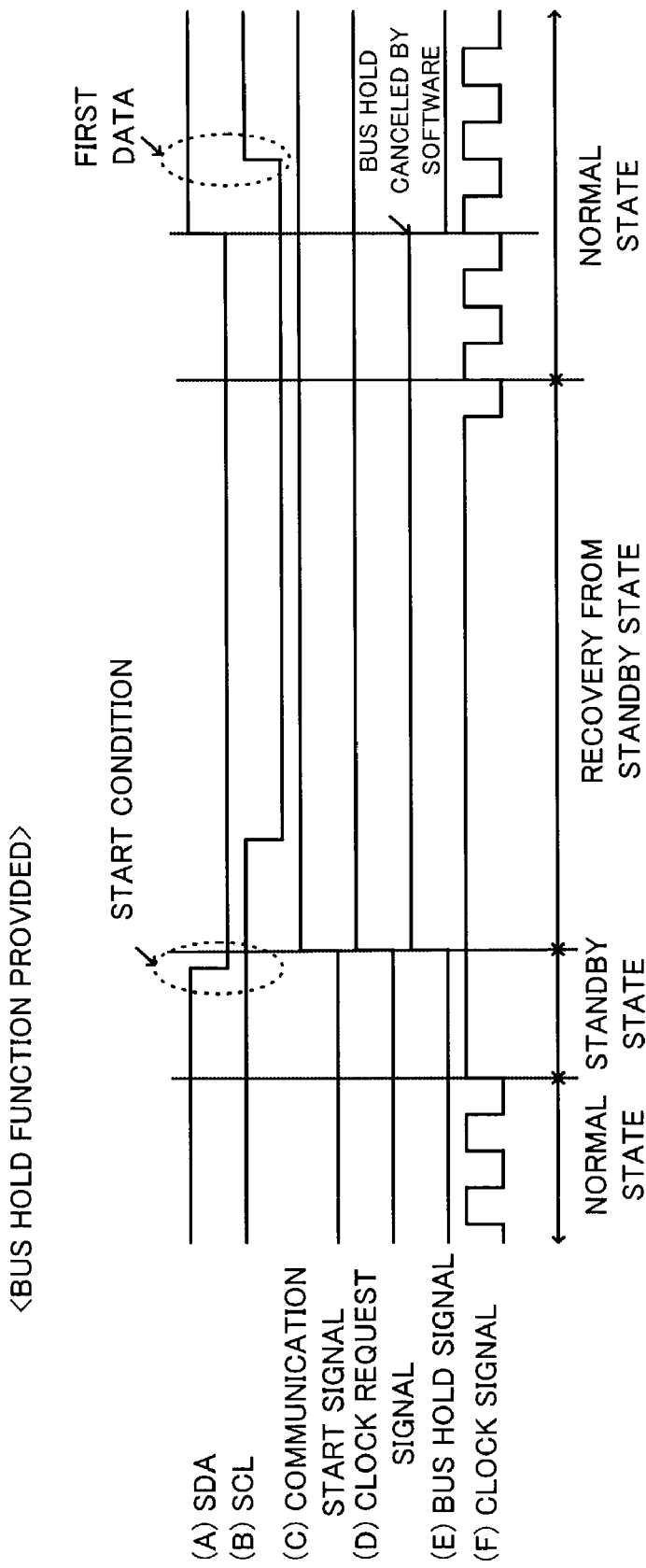
FIG. 9 is a timing chart also illustrating operation of the embodiment shown in FIG. 7.

According to this embodiment, on the other hand, the CPU 101 continuously sets the bus hold signal to "H" from the recovery from the standby state until a predetermined time elapses after the output of the clock signal is started, as shown in FIG. 9, in accordance with a predetermined program, thereby to keep the semiconductor switch 104e turned "ON". Since the SCL signal line is thus kept at "L", it is possible to prevent data from being input during the recovery from the standby state and a consequent failure to receive the data.

As described above, in the second embodiment of the present invention, the SCL signal line of the bus 110 is kept in the "L" state during the period of the recovery from the standby state by means of the bus hold signal generated on a software basis by the CPU 101, whereby it is possible to prevent data from being input during this period and thus a consequent failure to receive the data.

A third embodiment of the present invention will be now described.

Figure 10:
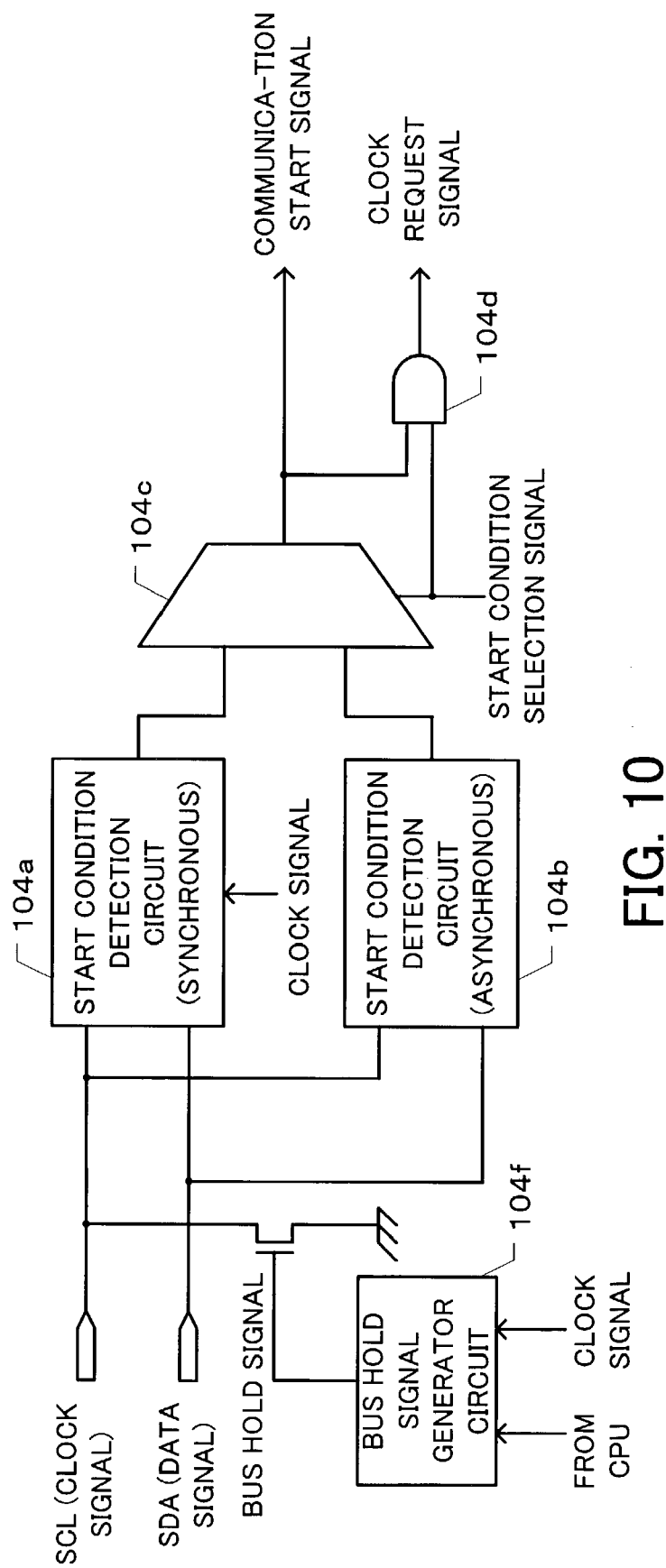
FIG. 10 is a diagram illustrating an exemplary configuration according to a third embodiment of the present invention.

FIG. 10 illustrates an exemplary configuration according to the third embodiment of the present invention. In the figure is illustrated an example of detailed configuration of the communication circuit 104 appearing in FIG. 2. Since the other parts of the information processing device are identical with those shown in FIG. 2, description thereof is omitted. Also, identical reference numerals are used to denote elements corresponding to those of the second embodiment shown in FIG. 7, and description of such elements is omitted.

As illustrated in the figure, the communication circuit 104 according to the third embodiment of the present invention comprises a start condition detection circuit (synchronous) 104a, a start condition detection circuit (asynchronous) 104b, a selector 104c, an AND gate 104d, a semiconductor switch 104e, and a bus hold signal generator circuit 104f.

This embodiment differs from the second embodiment shown in FIG. 7 in that the bus hold signal generator circuit 104f is additionally provided.

The bus hold signal generator circuit 104f sets a bus hold signal therefrom to "H" when the device is in the standby state, in accordance with instructions from the CPU 101, and sets the bus hold signal to "L" upon detecting the first leading edge of the clock signal after the recovery from the standby state.

Operation according to the third embodiment of the present invention will be now described.

Figure 11:
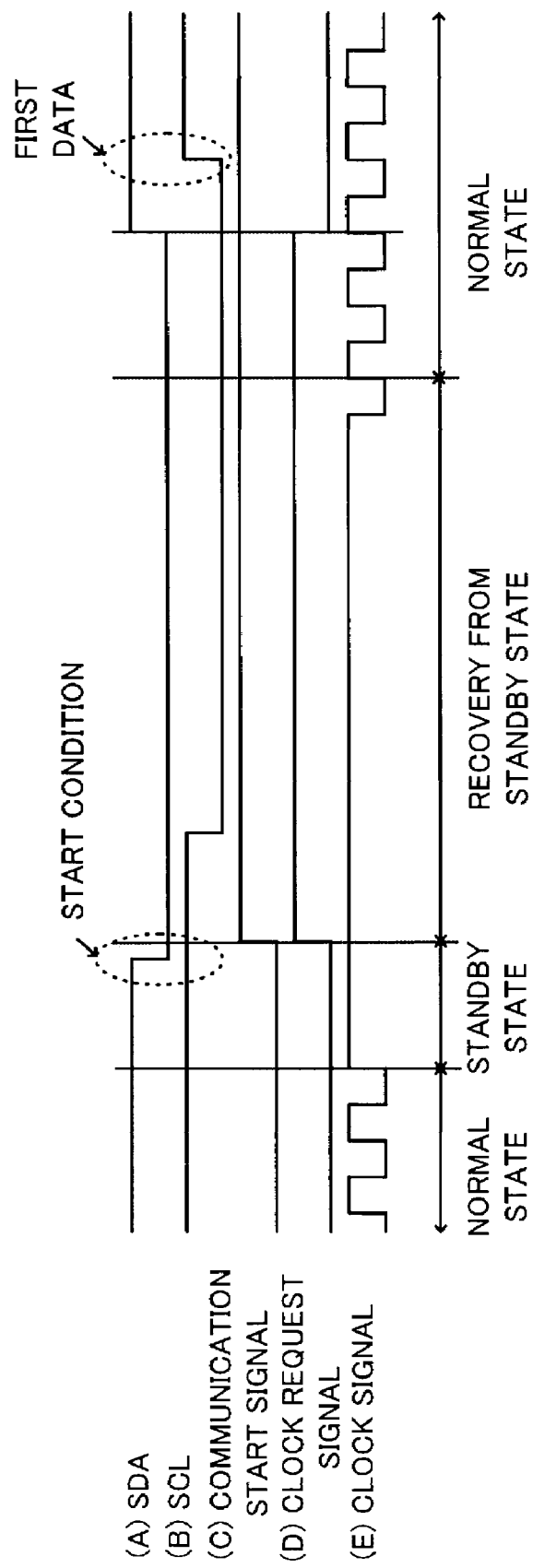
FIG. 11 is a timing chart illustrating operation of the embodiment shown in FIG. 10.

FIG. 11 illustrates the operation of the second embodiment described above. In the second embodiment, when the predetermined time has passed from the recovery from the standby state following the detection of the start condition (a state in which the SDA (cf. (A) in FIG. 11) falls while the SCL (cf. (B) in FIG. 11) is at "H"), indicated by a dotted ellipse in the figure, the CPU 101 sets the bus hold signal to "L" by means of software to thereby cancel the bus hold state.

Since the setting of the bus hold signal is controlled by software, however, an additional load is imposed on the CPU 101 and also a certain period of time is needed before the bus hold state is canceled. Accordingly, in the third embodiment, the bus hold signal is inactivated on a hardware basis by the bus hold signal generator circuit 104f.

Figure 12:
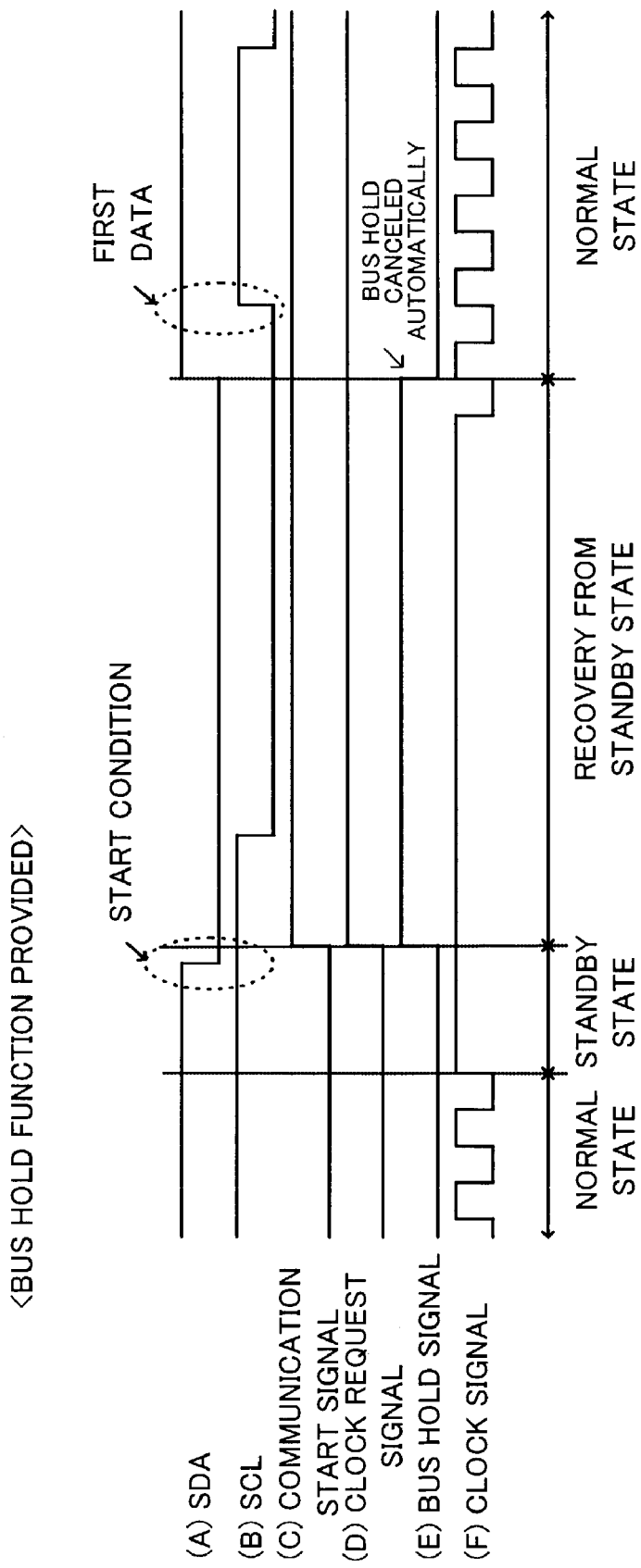
FIG. 12 is a timing chart also illustrating operation of the embodiment shown in FIG. 10.

Specifically, in this embodiment, on detecting the first leading edge of the clock signal after the recovery from the standby state, the bus hold signal generator circuit 104f sets the bus hold signal to "L", as shown in FIG. 12.

Since, as a result, the semiconductor switch 104e turns OFF, the information processing device 120 recognizes that the bus hold state has been canceled, and thus starts to transmit first data (cf. (A) and (B) in FIG. 12).

Thus, in the third embodiment of the present invention, when a leading edge of the clock signal is detected after the recovery from the standby state, the bus hold state is canceled by the bus hold signal generator circuit 104f. Accordingly, the bus hold state can be canceled without imposing a load on the CPU 101 after the recovery from the standby state.

Also, since the bus hold state is canceled upon detection of the first leading edge of the clock signal after the recovery from the standby state, the bus hold state can be canceled quickly, compared with the case where the bus hold state is canceled by software.

A fourth embodiment of the present invention will be now described.

Figure 13:
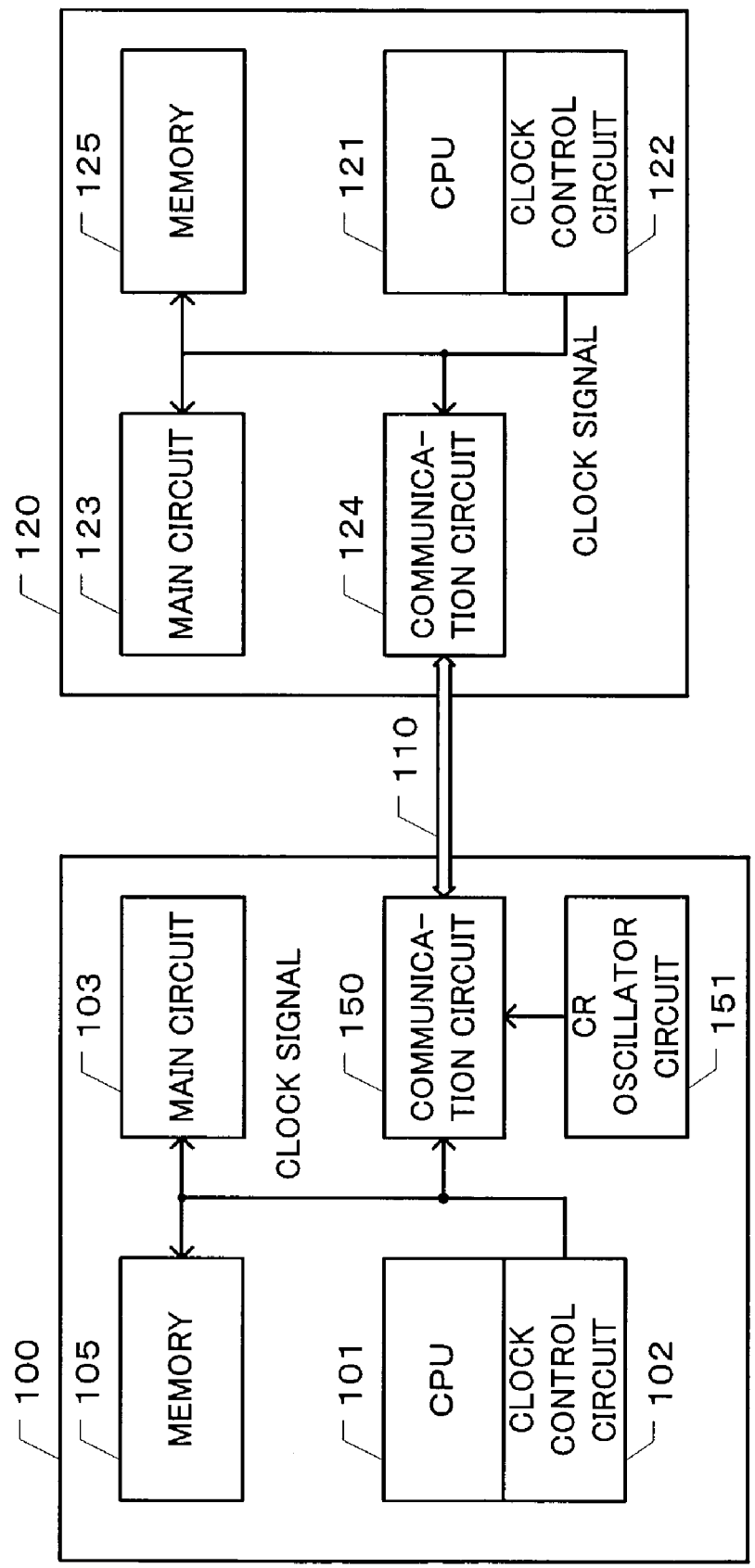
FIG. 13 is a diagram illustrating an exemplary configuration according to a fourth embodiment of the present invention.

FIG. 13 illustrates an exemplary configuration according to the fourth embodiment of the present invention. In the figure, identical reference numerals are used to denote elements corresponding to those of the first embodiment shown in FIG. 2, and description of such elements is omitted.

As shown in the figure, in the fourth embodiment of the present invention in comparison with the first embodiment, the communication circuit 104 is replaced by a communication circuit 150, and a CR oscillator circuit 151 is additionally provided. In other respects, the fourth embodiment is configured in the same manner as the first embodiment.

Figure 14:
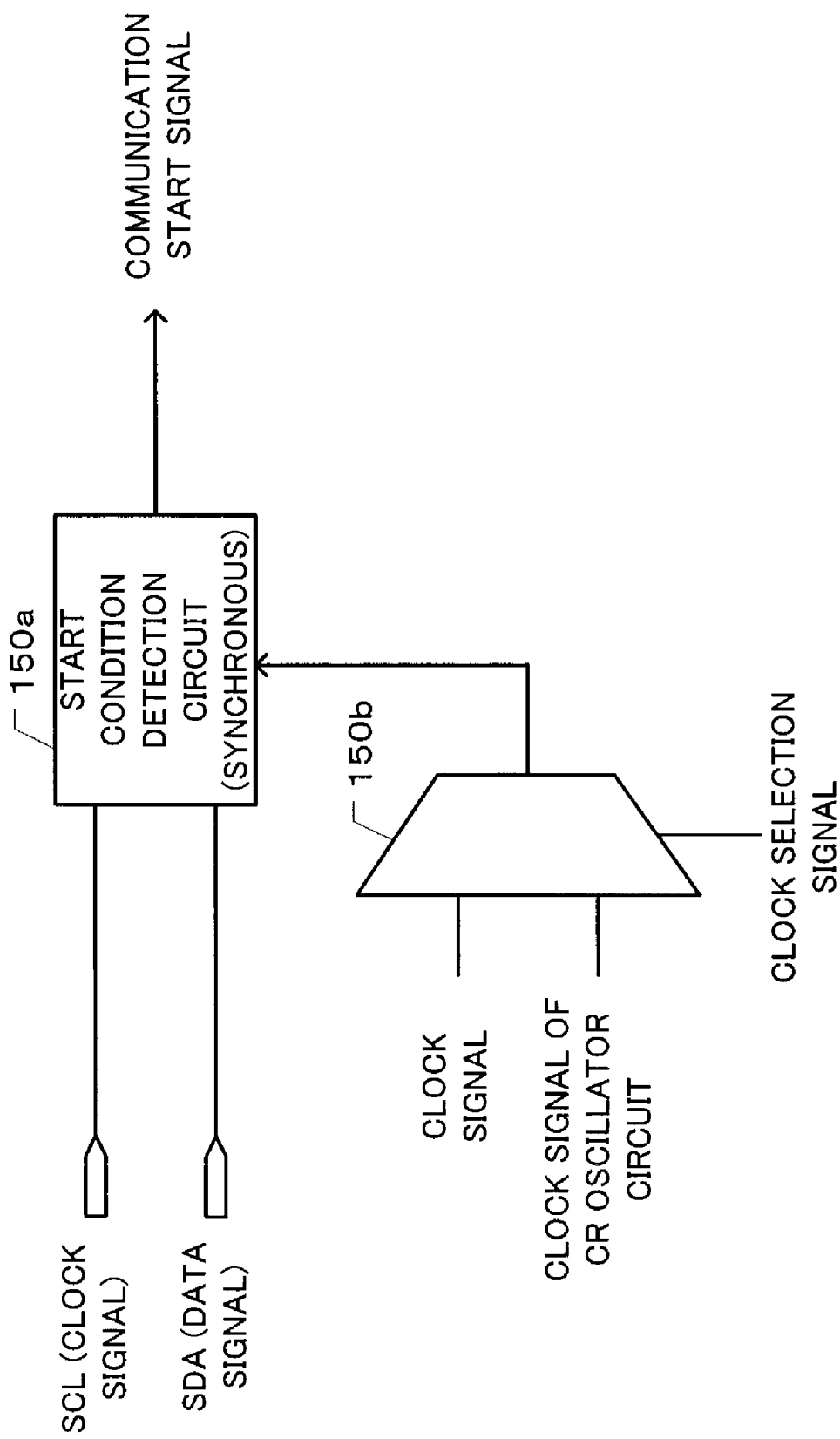
FIG. 14 is a diagram illustrating in detail an exemplary configuration of a communication circuit appearing in FIG. 13.

The communication circuit 150 comprises, as shown in FIG. 14, a start condition detection circuit 150a and a selector 150b.

The start condition detection circuit 150a detects the start condition and outputs the communication start signal in synchronism with a clock signal supplied from the selector 150b.

In accordance with a clock selection signal supplied from the CPU 101, the selector 150b selects one of the clock signal supplied from the clock control circuit 102 and the clock signal supplied from the CR oscillator circuit 151, mentioned below, and supplies the selected signal to the start condition detection circuit 150a.

The CR oscillator circuit 151, which comprises, like a phase-shift oscillator circuit, a capacitor, a resistor and an active element such as an operational amplifier or a transistor, for example, oscillates at a predetermined frequency and supplies the resulting oscillation signal to the selector 150b.

A Schmitt trigger circuit or the like, for example, may be inserted at the output side of the CR oscillator circuit 151 so that the output signal may have a rectangular waveform. Also, the oscillation frequency of the CR oscillator circuit 151 may be set lower than that of the clock control circuit 102, to thereby restrain the power consumption.

Operation according to the fourth embodiment of the present invention will be now described.

In the normal state, the CPU 101 controls the selector 150b so as to select the clock signal output from the clock control circuit 102, and accordingly, the start condition detection circuit 150a detects the start condition in synchronism with this clock signal. In this case, therefore, it is possible to prevent malfunction from being caused under the influence of noise.

On the other hand, when the device switches to the standby state, the CPU 101 controls the selector 150b so as to select the output of the CR oscillator circuit 151. As a result, the start condition detection circuit 150a is supplied with the clock signal generated by the CR oscillator circuit 151.

Compared with a crystal oscillator circuit which is controlled by the clock control circuit 102, the CR oscillator circuit 151 is simple in structure and low in power consumption, though the oscillation frequency is unstable. Also, the CR oscillator circuit requires a shorter time for the oscillation to be stabilized.

Thus, by detecting the start condition with the use of the clock signal output from the CR oscillator circuit 151, it is possible to reduce the power consumption, compared with the case of using the clock control circuit 102.

Also, since the clock signal supplied from the clock control circuit 102 determines the operating speed of the information processing device 100, the frequency thereof cannot be readily changed. However, where the CR oscillator circuit 151 is provided as a separate oscillator circuit and the clock signal output therefrom is supplied to the communication circuit 150 only during the standby state, the frequency of this clock signal can be set as desired, because the CR oscillator circuit exerts no influence on the other circuits. Thus, by setting the clock frequency to an optimum frequency in consideration of power consumption, it is possible to cut down the electric power consumed by the circuits as a whole in the standby state.

Further, in the standby state, the start condition is detected in synchronism with the clock signal, and therefore, the influence of noise etc. can be minimized.

As described above, in the fourth embodiment of the present invention, the CR oscillator circuit 151 is provided and used for detecting the start condition in the standby state, whereby malfunction can be prevented from being caused by noise etc.

Also, by suitably setting the CR oscillator circuit 151, it is possible to cut down the consumption of power by the whole device in the standby state.

A fifth embodiment of the present invention will be now described.

Figure 15:
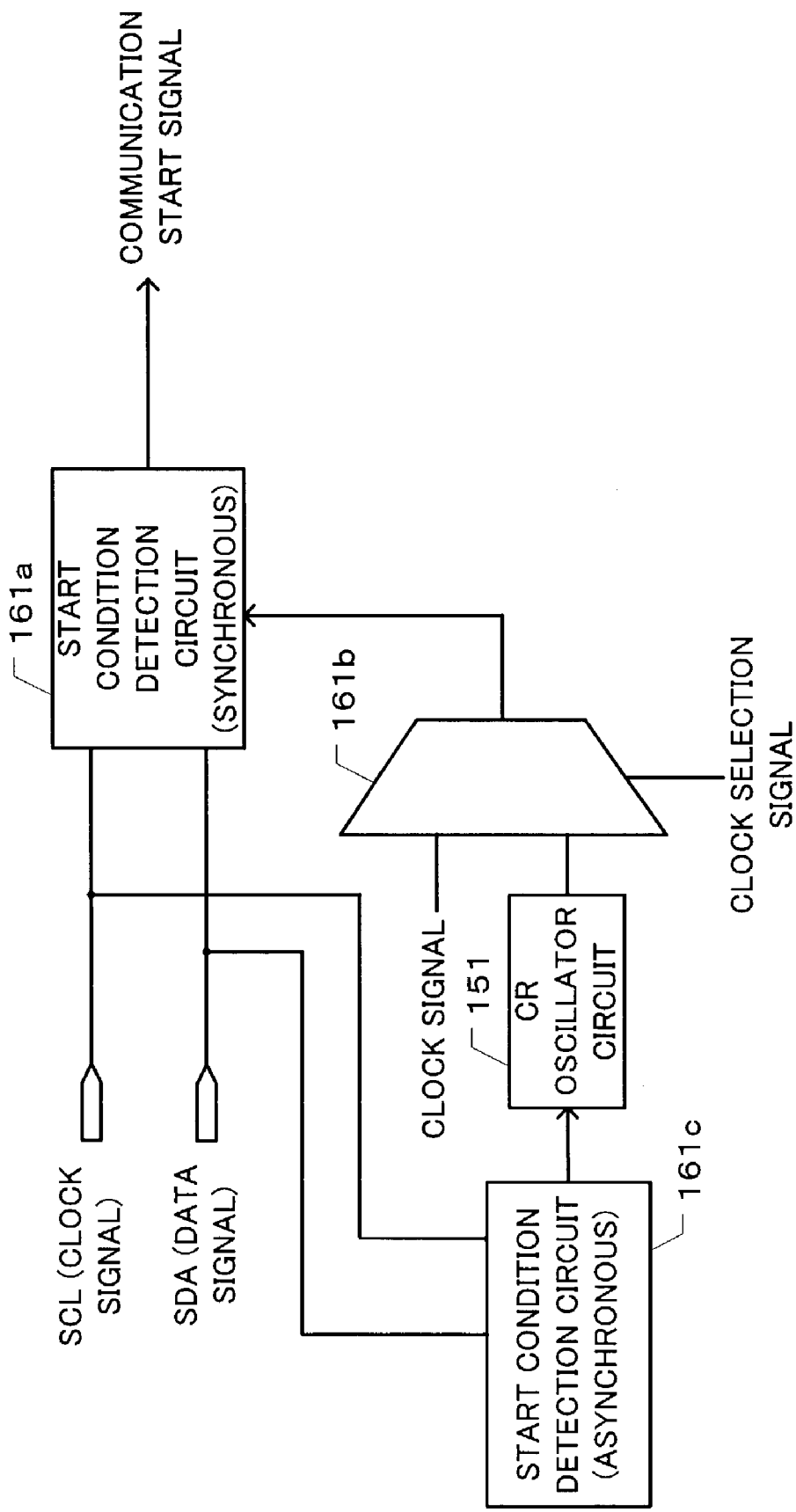
FIG. 15 is a diagram illustrating an exemplary configuration according to a fifth embodiment of the present invention.

FIG. 15 illustrates an exemplary configuration according to the fifth embodiment of the present invention. The figure is illustrated an example of detailed configuration of the communication circuit 150 appearing in FIG. 13. Since the other parts of the device except the communication circuit 150 are identical with those shown in FIG. 13, description thereof is omitted.

As shown in FIG. 15, the communication circuit 150 according to the fifth embodiment of the present invention comprises a start condition detection circuit (synchronous) 161a, a selector 161b, and a start condition detection circuit (asynchronous) 161c. The CR oscillator circuit 151 is connected between the start condition detection circuit 161c and the selector 161b.

The start condition detection circuit 161a detects a communication request in synchronism with the clock signal supplied from the selector 161b.

The selector 161b selects one of the clock signal supplied from the clock control circuit 102 and the clock signal supplied from the CR oscillator circuit 151 in accordance with the clock selection signal supplied from the CPU 101, and supplies the selected signal to the start condition detection circuit 161a.

The start condition detection circuit 161c detects the start condition based on the states of signals supplied thereto from the information processing device 120, in a manner asynchronous with the clock signal.

The CR oscillator circuit 151 comprises a phase-shift oscillator circuit or the like, as in the foregoing embodiment, and generates and outputs a clock signal with a predetermined frequency.

Operation according to the fifth embodiment of the present invention will be now described.

When the information processing device 100 is in the normal state, the CPU 101 controls the selector 161b so as to select the clock signal supplied from the clock control circuit 102. Accordingly, the start condition detection circuit 161a detects the start condition in synchronism with this clock signal.

On the other hand, when the device switches to the standby state, the CPU 101 controls the selector 161b so as to select the clock signal output from the CR oscillator circuit 151. In this embodiment, the CR oscillator circuit 151 is started to supply a clock signal when the start condition is detected by the start condition detection circuit 161c. Accordingly, when a communication request is made by the information processing device 120, the request is first detected by the start condition detection circuit 161c, and as a result of the detection the CR oscillator circuit 151 starts to oscillate.

The start condition detection circuit 161a detects the start condition in synchronism with the clock signal supplied via the selector 161b, recognizes that the communication request has been made, and requests the CPU 101 to start the supply of the clock signal. As a result, the supply of the clock signal from the clock control circuit 102 is started, whereupon the individual parts of the information processing device 100 start to operate.

After the clock signal is stabilized, the CPU 101 controls the CR oscillator circuit 151 to stop its oscillation.

As described above, the fifth embodiment of the present invention is provided with the CR oscillator circuit 151, and when the start condition is detected by the start condition detection circuit 161c, a clock signal is output from the CR oscillator circuit so that the start condition may be detected by the start condition detection circuit 161a in synchronism with this clock signal. It is therefore possible to prevent malfunction from being caused under the influence of noise.

Also, since the operation of the CR oscillator circuit 151 remains stopped until the start condition is detected by the start condition detection circuit 161c, the consumption of power in the standby state can be further cut down.

A sixth embodiment of the present invention will be now described.

Figure 16:
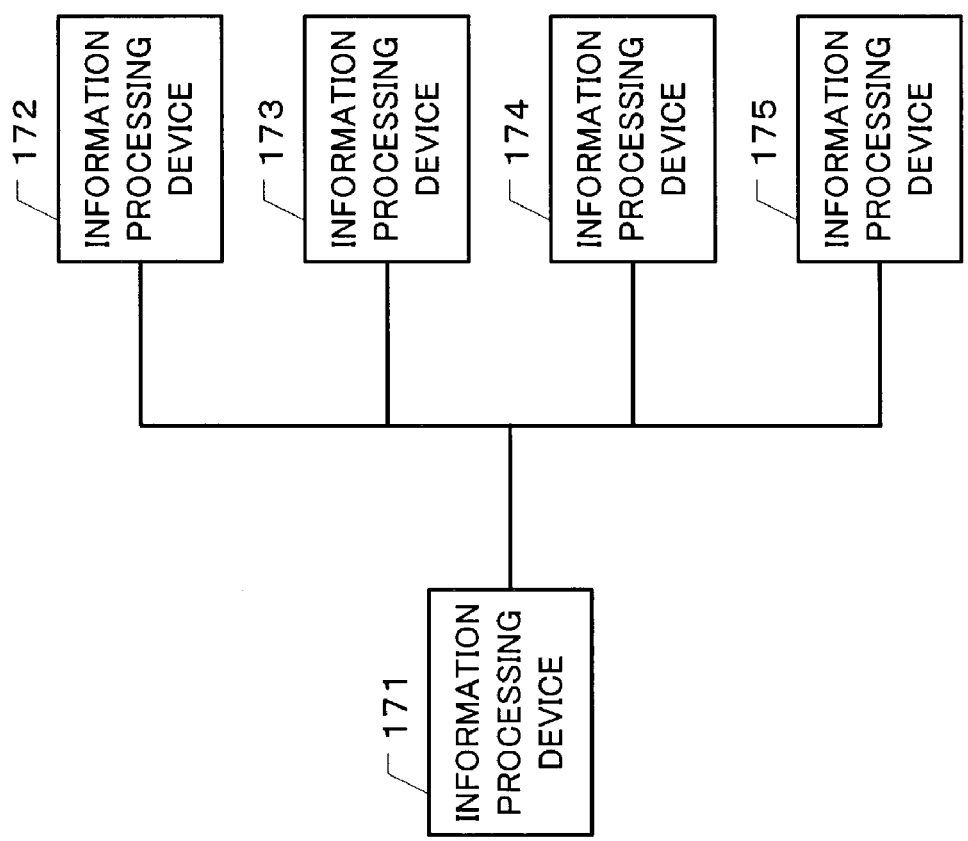
FIG. 16 is a diagram illustrating an exemplary configuration according to a sixth embodiment of the present invention.

FIG. 16 illustrates an exemplary configuration according to the sixth embodiment of the present invention. As shown in the figure, in the sixth embodiment of the present invention, information processing devices 171 to 175 are connected to one another. Each of the information processing devices 171 to 175 is configured in the same manner as the information processing device 100 shown in FIG. 2 or 13, and therefore, description thereof is omitted.

Figure 17:
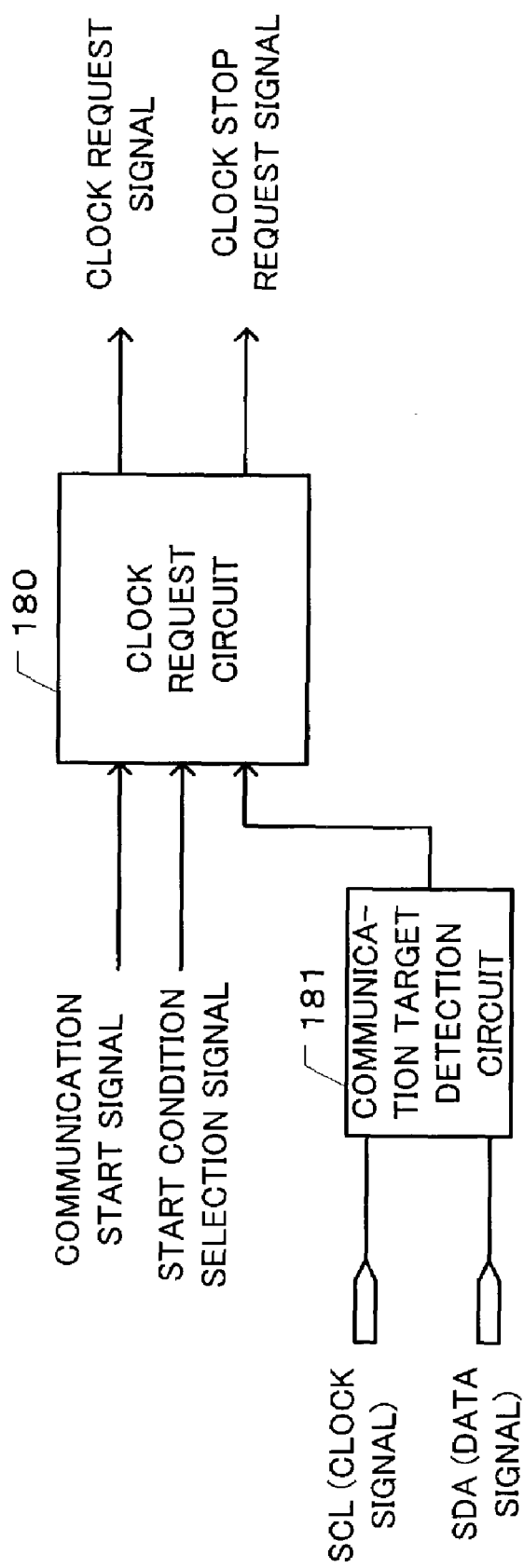
FIG. 17 is a diagram illustrating in detail an exemplary configuration of a communication circuit of an information processing device appearing in FIG. 16.

FIG. 17 shows in detail an exemplary configuration of the communication circuit provided in each of the information processing devices 171 to 175 shown in FIG. 16.

As illustrated in the figure, the communication circuit according to the sixth embodiment of the present invention comprises a clock request circuit 180 and a communication target detection circuit 181.

The clock request circuit 180 looks up the communication start signal, the start condition selection signal and a detection signal supplied from the communication target detection circuit 181, and supplies a clock request signal and a clock stop request signal to the clock control circuit 102.

The communication target detection circuit 181 monitors the SCL and SDA signals. On detecting a start condition from any one of the other information processing devices, the communication target detection circuit 181 detects a target of communication to which the request is directed and notifies the clock request circuit 180 of the target.

Operation according to the sixth embodiment of the present invention will be now described.

First, operation performed in the information processing device when the device itself is selected as the target of communication will be explained.

Figure 18:
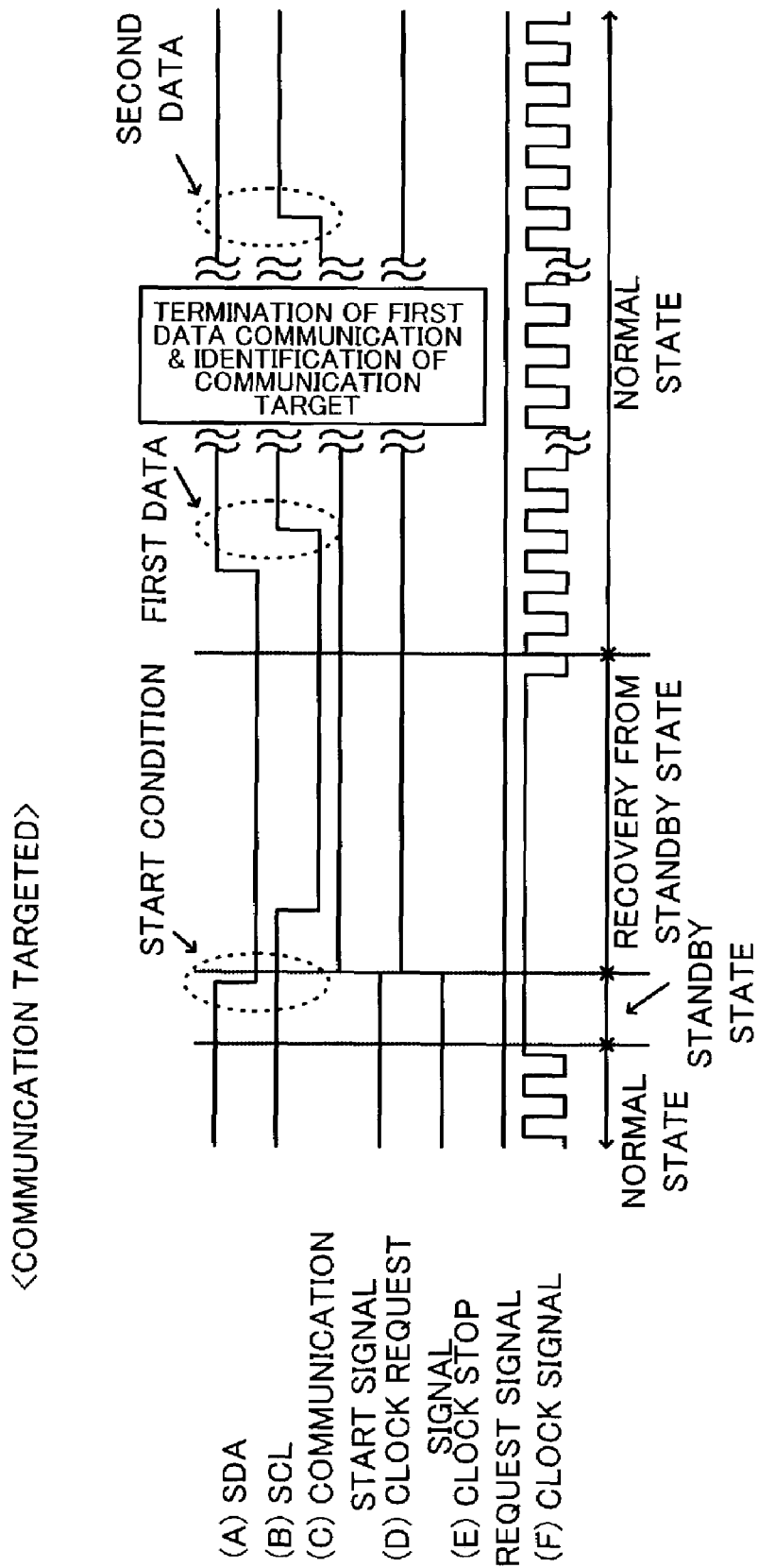
FIG. 18 is a timing chart illustrating operation of the embodiment shown in FIG. 16.

As shown in FIG. 18, on detection of the start condition that the SDA signal (cf. (A) in FIG. 18) falls while the SCL signal (cf. (B) in FIG. 18) is at "H", the communication start signal (cf. (C) in FIG. 18) turns to "H".

As a result, the clock request circuit 180 sets the clock request signal (cf. (D) in FIG. 18) to "H", so that the clock control circuit 102 starts to output a clock signal (cf. (F) in FIG. 18).

After the communication of first data ends following the start of the output of the clock signal, the communication target detection circuit 181 looks up the first data to determine whether or not the communication request thereof is directed to its own device. For example, provided that the SDA and SCL signals are each a one-bit signal, the communication target detection circuit judges that its own device has been selected if the value indicated by the one-bit signals is "11", for example.

If the communication request is directed to its own device, the communication target detection circuit sends a notification to this effect to the clock request circuit 180. As a result, the clock request circuit 180 continues to output the clock request signal, so that the second and succeeding data is received and processed.

Figure 19:
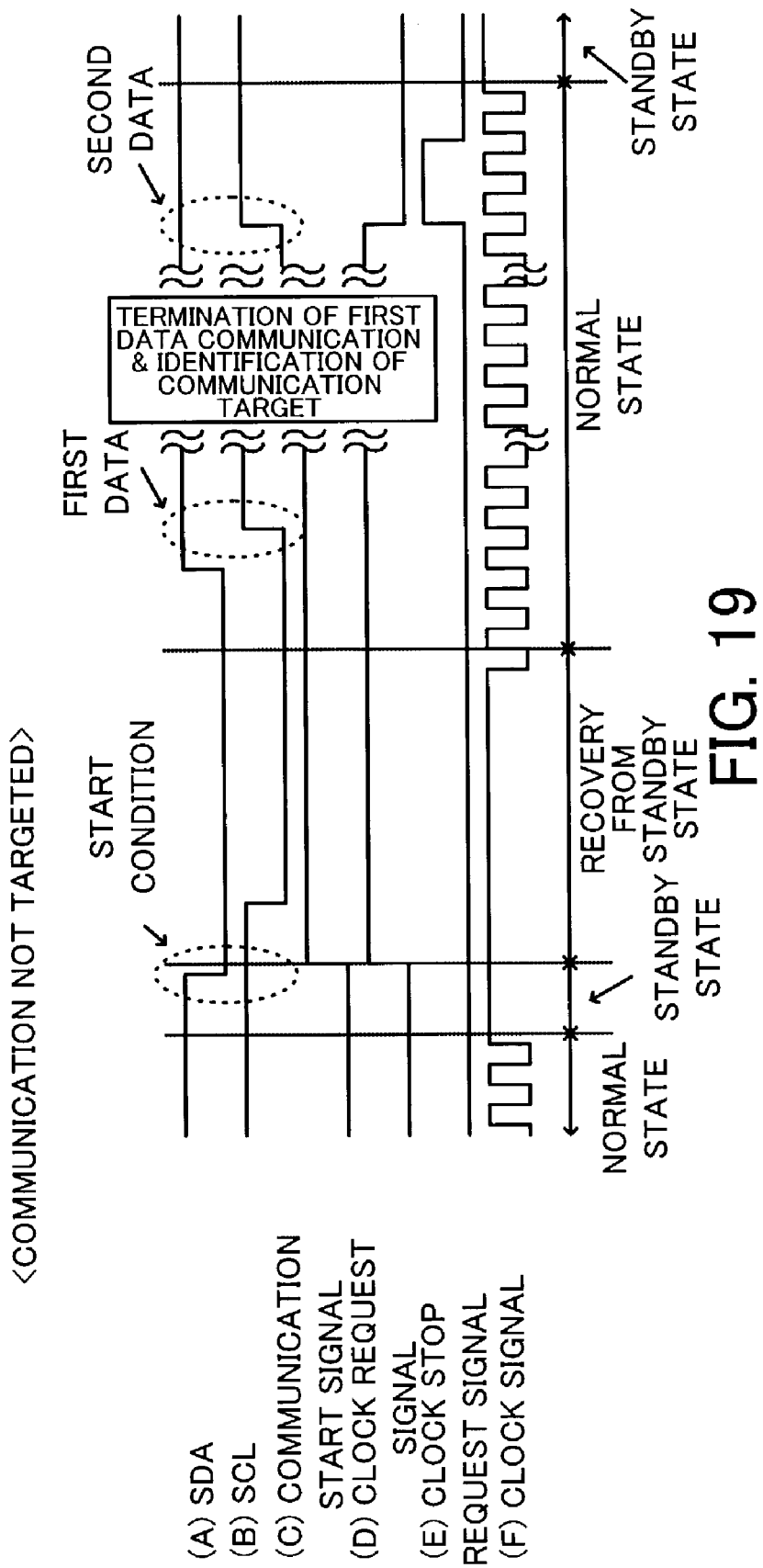
FIG. 19 is a timing chart also illustrating operation of the embodiment shown in FIG. 16.
Figure 20:
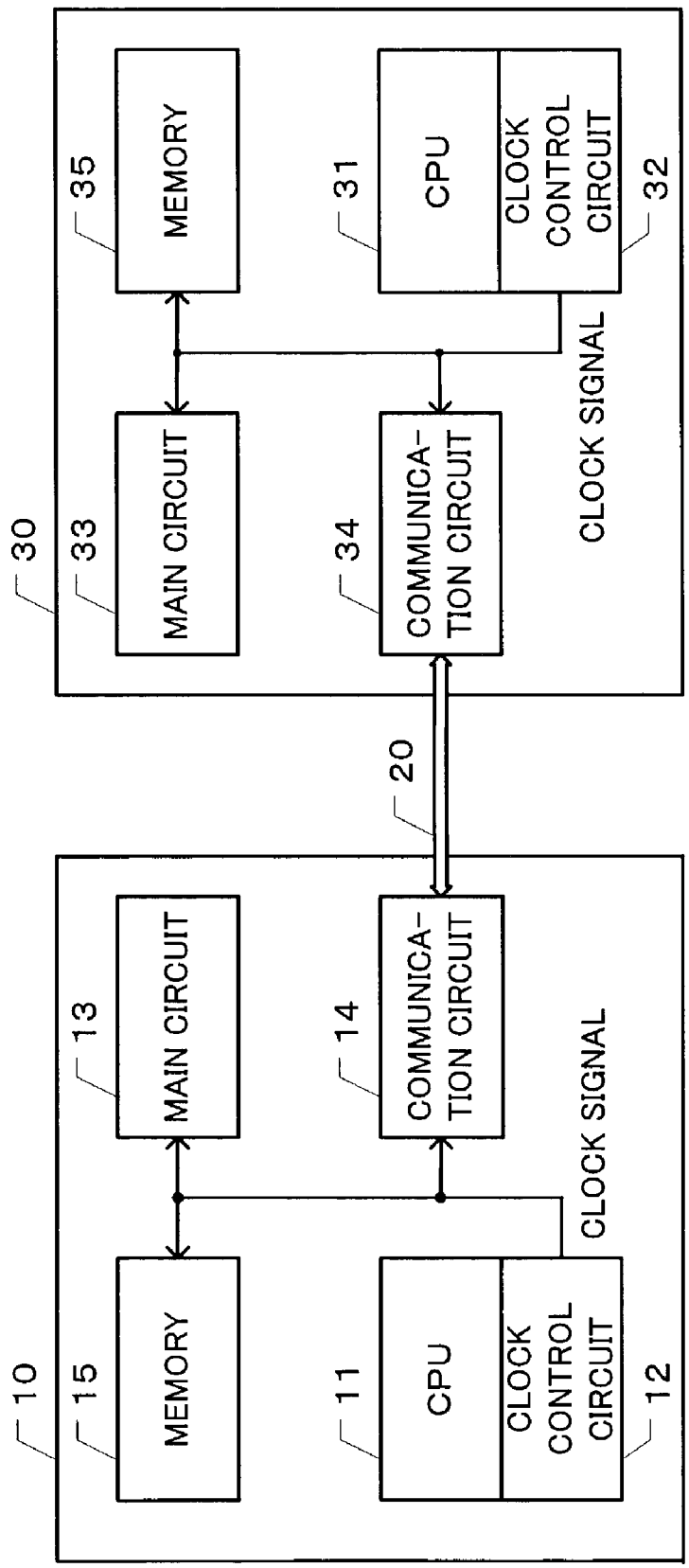
FIG. 20 is a diagram illustrating an exemplary configuration of a conventional information processing device.
Figure 21:
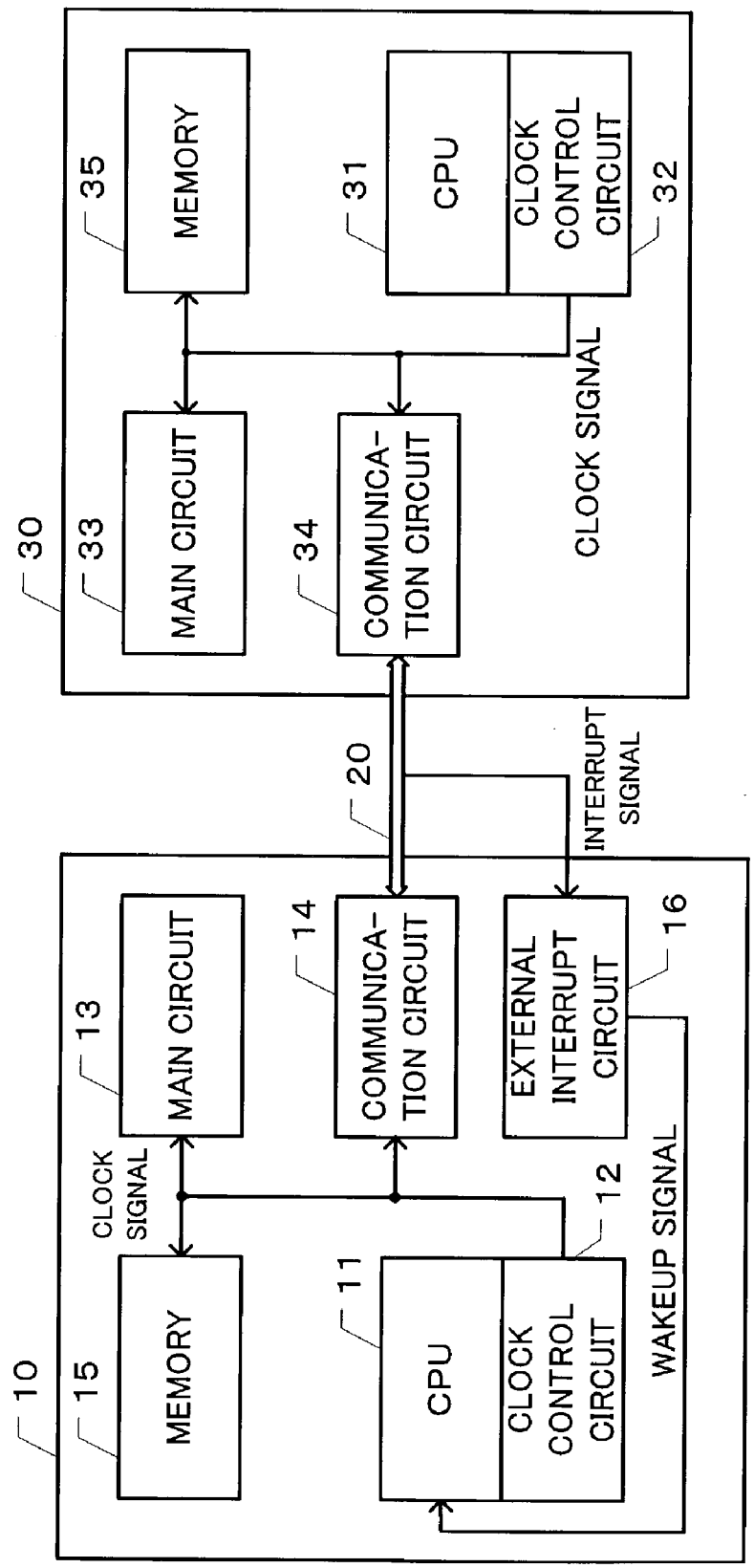
FIG. 21 is a diagram illustrating an exemplary configuration of another conventional information processing device.

Referring now to FIG. 19, operation performed in the information processing device when some other device is selected as the target of communication will be explained.

As shown in FIG. 19, on detection of the start condition that the SDA signal (cf. (A) in FIG. 19) falls while the SCL signal (cf. (B) in FIG. 19) is at "H", the communication start signal (cf. (C) in FIG. 19) turns to "H".

As a result, the clock request circuit 180 sets the clock request signal (cf. (D) in FIG. 19) to "H", so that the clock control circuit 102 starts to output a clock signal (cf. (F) in FIG. 19).

After the communication of first data ends following the start of the output of the clock signal, the communication target detection circuit 181 looks up the first data to determine whether or not the communication request thereof is directed to its own device.

If the communication request is not directed to its own device, the communication target detection circuit sends a notification to this effect to the clock request circuit 180. Consequently, the clock request circuit 180 outputs the clock stop request signal to the clock control circuit 102, so that the circuit 102 stops generating the clock signal. As a result, the information processing device resumes the standby state.

The start condition selection signal may be set so that the information processing device does not return to the standby state even if it is not selected as the target of communication.

As described above, in the sixth embodiment of the present invention, if the information processing device judges after the recovery from the standby state that it is not selected as the target of communication, the device resumes the standby state. It is therefore possible to further cut down the consumption of power by a system having a plurality of information processing devices connected to one another.

Although the foregoing embodiments are explained on the assumption that the present invention is applied to I²C bus, the present invention can be applied to other types of bus such as USB (Universal Serial Bus), for example.

In a USB, communication is performed using two communication lines "D+" and "D−". The two communication lines (communication bus) are pulled down by a Host (information processing device to which the present invention is applied), and accordingly, the bus lines are fixed at "L".

If, in this state, another information processing device is connected externally to the bus lines, one of the communication lines turns to "H", whereupon the information processing device is set ready for communication. An information processing device with low transmission speed pulls up the D− signal line while an information processing device with high transmission speed pulls up the D+ signal line; therefore, the transmission speed can be detected based on the pulled-up signal line.

In view of this USB specification, the present invention may be applied in a manner such that a Host, which is in the standby state, is made to wake up on detecting the connection of another information processing device.

As described above, the present invention provides an information processing device connected to a second information processing device for communicating information therewith through a bus, the information processing device comprising a first condition detection circuit for detecting, synchronously with a clock signal, a communication start condition for starting communication with the second information processing device, a second condition detection circuit for detecting, asynchronously with the clock signal, the communication start condition for starting communication with the second information processing device, and a selector circuit for selecting a suitable one of the first and second condition detection circuits. Accordingly, the communication start condition can be detected by an optimum method matching the operating state of the information processing device.

The present invention also provides an information processing device connected to a second information processing device for communicating information therewith through a bus, the information processing device comprising a first condition detection circuit for detecting, synchronously with a clock signal, a communication start condition for starting communication with the second information processing device, a CR oscillator circuit for oscillating at a predetermined frequency, a second condition detection circuit for detecting, synchronously with a signal output from the CR oscillator circuit, the communication start condition for starting communication with the second information processing device, and a selector circuit for selecting a suitable one of the first and second condition detection circuits. It is therefore possible to quickly and accurately detect the communication start condition by using the CR oscillator circuit which is low in power consumption and capable of quick startup.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An information processing device connected to a second information processing device for communicating information therewith through a bus, comprising:
    a clock control circuit for controlling start and stop of supply of a clock signal to individual parts of said information processing device;
    a first condition detection circuit for detecting, synchronously with the clock signal, a communication start condition for starting communication with the second information processing device;
    a second condition detection circuit for detecting, asynchronously with the clock signal, the communication start condition for starting communication with the second information processing device; and
    a selector circuit for selecting a suitable one of said first and second condition detection circuits;
    wherein said second condition detection circuit detects the communication start condition for starting communication with the second information processing device when the supply of the clock signal to the individual parts of said information processing device is stopped by said clock control circuit.

2. The information processing device according to claim 1, wherein said clock control circuit restarts the supply of the clock signal when the communication start condition for starting communication with the second information processing device is detected by said second condition detection circuit.

3. The information processing device according to claim 1, further comprising a holding circuit for setting a communication line connected to the second information processing device in a hold state when the supply of the clock signal to said information processing device is stopped by said clock control circuit.

4. The information processing device according to claim 3, wherein said holding circuit cancels the hold state when the supply of the clock signal is started by said clock control circuit.

5. The information processing device according to claim 1, further comprising a communication target detection circuit for detecting a target of communication when the communication start condition is detected by said second condition detection circuit,
wherein said clock control circuit again stops the supply of the clock signal if the target of communication detected by said communication target detection circuit is not said information processing device.

6. An information processing device connected to a second information processing device for communicating information therewith through a bus, comprising:
a clock control circuit for controlling start and stop of supply of a clock signal to individual parts of said information processing device;
a first condition detection circuit for detecting, synchronously with the clock signal, a communication start condition for starting communication with the second information processing device;
a CR oscillator circuit for oscillating at a predetermined frequency;
a second condition detection circuit for detecting, synchronously with a signal output from said CR oscillator circuit, the communication start condition for starting communication with the second information processing device;
a selector circuit for selecting a suitable one of said first and second condition detection circuits;
wherein said second condition detection circuit detects the communication start condition for starting communication with the second information processing device when the supply of the clock signal to the individual parts of said information processing device is stopped by said clock control circuit.

7. The information processing device according to claim 6, wherein said clock control circuit restarts the supply of the clock signal when the communication start condition for starting communication with the second information processing device is detected by said second condition detection circuit.

8. The information processing device according to claim 6, further comprising a holding circuit for setting a communication line connected to the second information processing device in a hold state when the supply of the clock signal to said information processing device is stopped by said clock control circuit.

9. The information processing device according to claim 8, wherein said holding circuit cancels the hold state when the supply of the clock signal is started by said clock control circuit.

10. The information processing device according to claim 6, further comprising an oscillation control circuit for stopping the oscillation of said CR oscillator circuit when the supply of the clock signal to said information processing device by said clock control circuit is stabilized, and for starting the oscillation of said CR oscillator circuit when the communication start condition is detected by a third condition detection circuit which detects the communication start condition a synchronously with the clock signal.

11. The information processing device according to claim 6, further comprising a communication target detection circuit for detecting a target of communication when the communication start condition is detected by said second condition detection circuit,
wherein said clock control circuit again stops the supply of the clock signal if the target of communication detected by said communication target detection circuit is not said information processing device.

* * * * *

UNITED STATES PATENT AND TRADEMARK OFFICE
CERTIFICATE OF CORRECTION

PATENT NO. : 7,010,709 B2 Page 1 of 1
APPLICATION NO. : 10/354098
DATED : March 7, 2006
INVENTOR(S) : Norihiro Nakatsuhama et al.

It is certified that error appears in the above-identified patent and that said Letters Patent is hereby corrected as shown below:

On Title page, Item (54) Col. 1, in the Title Section , after "DEVICE" insert --HAVING BOTH SYNCHRONOUS AND ASYNCHRONOUS START DETECTORS FOR DETECTING BUS COMMUNICATION WHEN THE DEVICE IS CLOCKED OR UNCLOCKED--.

Column 16, line 25, change "a synchronously" to --asynchronously--.

Signed and Sealed this

Eleventh Day of July, 2006

JON W. DUDAS
*Director of the United States Patent and Trademark Office*